J. RUPPERT, Jr. & E. SIEGEL.
AUTOMOBILE TIRE.
APPLICATION FILED MAR. 5, 1912.
1,057,672.
Patented Apr. 1, 1913.
2 SHEETS—SHEET 1.
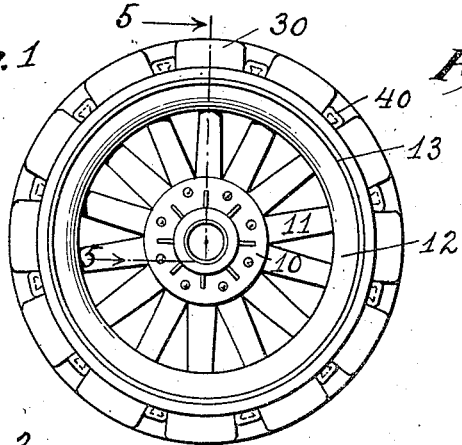
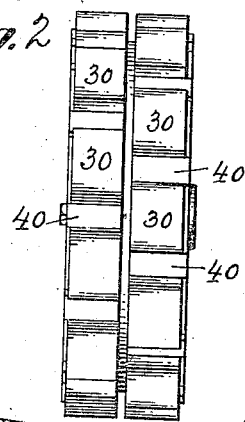
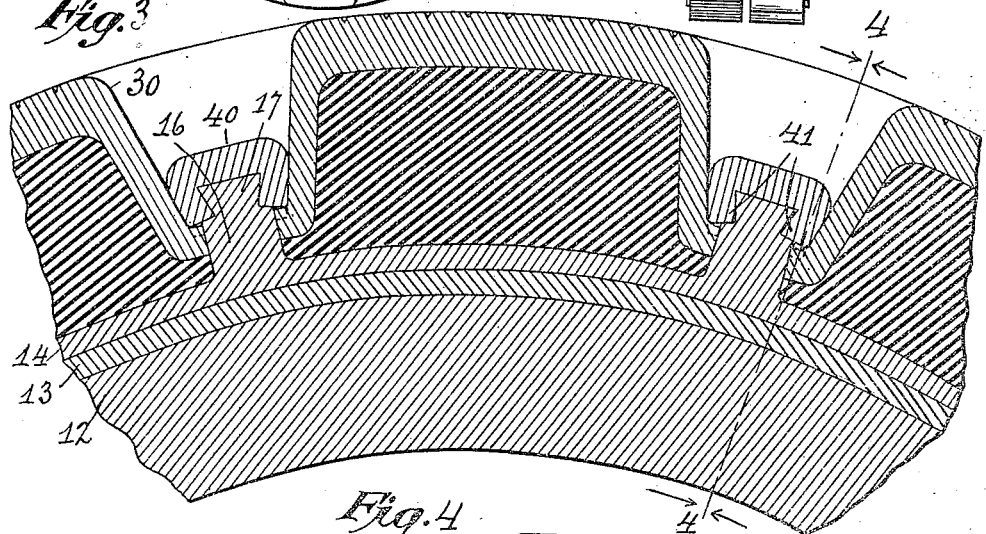
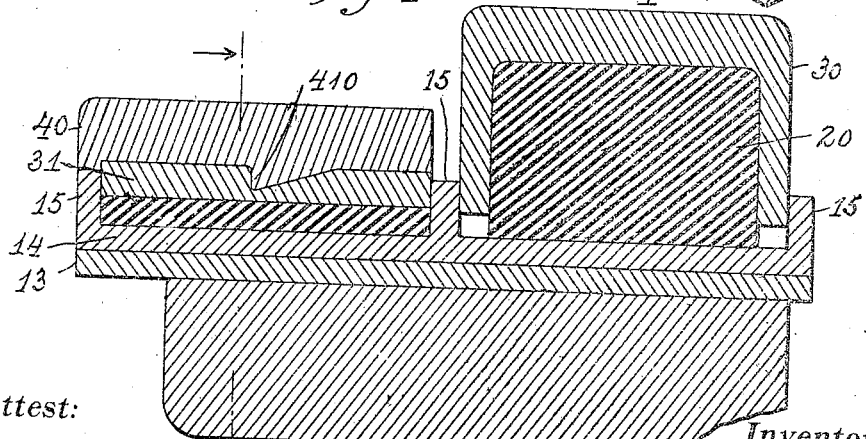
Attest:
Inventors
Jacob Ruppert, Jr.
and Ernest Siegel
by William R. Baird, Att'y J. RUPPERT, Jr. & E. SIEGEL.
AUTOMOBILE TIRE.
APPLICATION FILED MAR. 5, 1912.
1,057,672.
Patented Apr. 1, 1913.
2 SHEETS—SHEET 2.
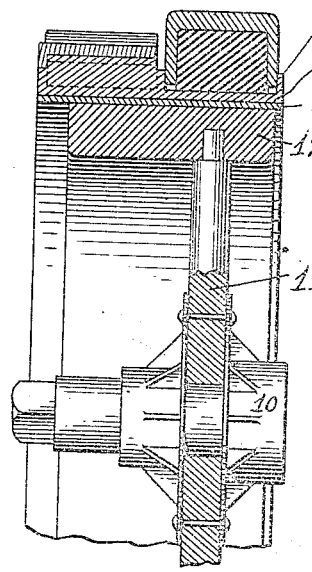
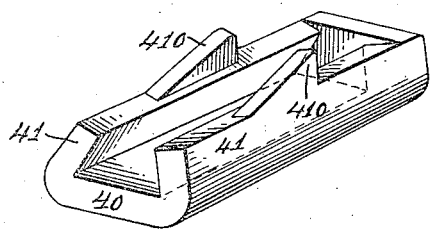
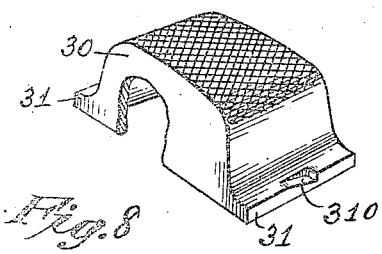
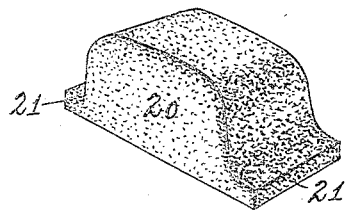
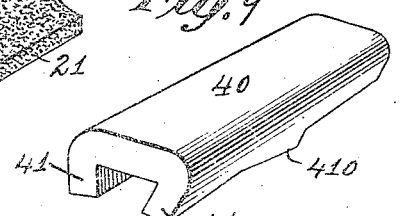
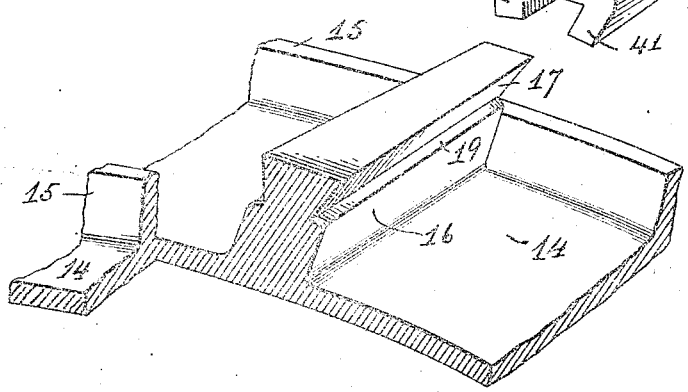
Attest:
Clarence G. Campbell
Stephen S. Newton
Inventors
Jacob Ruppert, Jr.
Ernest Siegel
by William R. Baird
Att'y

UNITED STATES PATENT OFFICE.

JACOB RUPPERT, JR., AND ERNEST SIEGEL, OF NEW YORK, N. Y., ASSIGNORS OF FIFTY-TWO ONE-HUNDREDTHS TO JACOB RUPPERT, JR., TWENTY-FOUR ONE-HUNDREDTHS TO ERNEST SIEGEL, AND TWENTY-FOUR ONE-HUNDREDTHS TO MICHAEL J. CANTOR, ALL OF NEW YORK, N. Y.

AUTOMOBILE-TIRE.

1,057,672.   Specification of Letters Patent.   Patented Apr. 1, 1913.

Application filed March 5, 1912. Serial No. 681,685.

*To all whom it may concern:*

Be it known that we, JACOB RUPPERT, Jr., and ERNEST SIEGEL, citizens of the United States, residing at New York, in the county of New York and State of New York, have invented certain new and useful Improvements in Automobile-Tires, of which the following is a specification.

This invention relates to tires for automobile trucks and the like and its novelty consists in the construction and adaptation of the parts, as will be more fully hereinafter pointed out.

The object of the invention is to produce a strong tire, with a slow wearing tread, sufficient elasticity for its purpose, easy to make and capable of readily being put into place and removed, and with few parts which parts are little likely to get out of order, which may be quickly adjusted, repaired or renewed.

In the drawings, there is illustrated a tire embodying the invention.

Figure 1 is a side view in miniature of a wheel provided with the tire; Fig. 2 is an edge view thereof; Fig. 3 is an enlarged section of a portion of the tire taken on a plane at right angles to the axle; Fig. 4 is a transverse section on the plane of the line 4—4 in Fig. 3; Fig. 5 is an enlarged section on the plane of the line 5—5 in Fig. 1; Fig. 6 is a perspective of one of the keys; Fig. 7 is a perspective of one of the treads; Fig. 8 is a perspective of one of the cushions; Fig. 9 is a perspective of one of the keys in a different position from that shown in Fig. 6; and Fig. 10 is a perspective of a portion of the rim.

In the drawings, 10 is the hub of a wheel, 11, 11 are the spokes and 12 is the felly. Outside of and encircling the felly is a felly band 13 preferably of steel and outside of that is a rim 14, having a circumferential flange 15 on each side and in the middle with a series of transverse ribs 16, each provided with a key way consisting of a dovetailed upper section 17 slightly tapering toward its inner end.

Cushions 20 with outwardly extending flanges 21 along their inner sides and made of rubber or other suitable elastic material are adapted to be placed within the several recesses of the rim 14, formed by the flanges 15, 15, 15 and the ribs 16, 16.

Treads 30 are made of steel or other suitable material of a general shape conforming to the shape of the cushions 20 and are intended snugly to fit over such cushions. The treads are each provided with outwardly extending flanges 31, 31 adapted to rest upon the flanges 21, 21 of the cushions 20 when in position, and the flanges are provided with indentations or recesses indicated at 310.

Hollow locking members or keys, comprising bodies 40 with inwardly turned sides 41 adapted to fit snugly over the dovetailed section 17 of each rib and open at one end and along one side and closed at the bottom, are adapted to hold the cushions and treads in position. The outer surface of these keys is preferably transversely curved and each side 41 is provided with a tooth 410 adapted to fit into the corresponding recess 310 of the tread with which it engages. The rim 14 is so arranged that the ribs 16 between the outer flange and middle flange on one side are staggered with respect to the ribs between the middle flange and outer flange on the other side, so that when the parts are assembled the treads on each one of these tires will be staggered with respect to those on the other.

When the parts are to be assembled a cushion 20 is put into one of the recesses of the rim 14, and a similar cushion is placed in the adjoining recess. Over each of these cushions is placed one of the treads 30. The thickness of the flanges 21 and 31 are so arranged that the treads must be pressed slightly and the flanges of the cushion compressed in order that the flange 31 shall clear a shoulder 19 formed along the rib 16 below the keyway. The key is then slid into position, the tread 30 being compressed to allow the tooth 410 of the key on each side to snap into the indentation or recess of the tread provided to receive it.

The sides of the key engaging the keyway on the rib and their inner sides and the flanges of the treads along the edges securely hold the tread 30 and consequently the cushion 20 in position. It will be noticed that in the form shown each key holds two treads one on each side of the ribs 16. The outer surfaces of these keys are transversely rounded so as to form a slightly rocking bearing for the sides of the tread and allow the latter a slight freedom of movement. The closed ends of the keys exclude the dirt. The elasticity of the rubber cushion under the tread exerts a constant tension upon the keys and prevents their accidental displacement, holding the teeth on the key in engagement with the notches in the tread flanges.

The wheel thus formed has metal treads, is simple in shape, is readily and cheaply made, is held securely in position but with a cushioned support adapted to take up the shocks of traction. The rims are readily made either in one or several pieces; the keys are simple and efficient. Any worn or broken part is easily replaced and the destruction or impairment of one tread, one key or one cushion does not affect the efficiency of any other similar member.

We claim:—

1. An automobile wheel, or the like, having a rim provided with transverse ribs, each provided with a key way on each side, elastic cushions with lateral flanges between the ribs, treads with similar flanges fitting over each cushion, a key adapted to engage each transverse rib on both sides and means for preventing the accidental displacement of the key, consisting of teeth and engaging notches on the sides of the key and the adjacent tread flanges.

2. An automobile wheel, or the like, having a rim provided with transverse ribs, each provided with a key way on each side, elastic cushions with lateral flanges between the ribs, treads with similar flanges fitting over each cushion, a key adapted to engage each transverse rib on both sides and means for preventing the accidental displacement of the key consisting of projecting teeth with sloping sides and corresponding notches on the sides of the key and the adjacent tread flanges.

3. An automobile wheel, or the like, having a rim provided with transverse ribs, each provided with a key way on each side, elastic cushions with lateral flanges between the ribs, treads with similar flanges fitting over each cushion, a key adapted to engage each transverse rib on both sides and means for preventing the accidental displacement of the key consisting of teeth and engaging notches on the sides of the key and the adjacent tread flanges, each tooth and notch being held in engagement by the inherent elasticity of the cushion behind the tread.

4. In a device of the character described, a rim, transverse ribs thereon having key ways, elastic cushions between the ribs, treads fitting over the cushion, keys one for each rib adapted to engage the key ways on each side thereof and means for engaging the keys and treads comprising sloping teeth on the one end and corresponding notches on the other.

5. In a device of the character described, a rim, transverse ribs thereon having key ways, elastic cushions between the ribs, treads fitting over the cushion, keys one for each rib adapted to engage the key ways on each side thereof and means for engaging the keys and treads comprising sloping teeth on the one and corresponding notches on the other, the teeth being adapted to be kept in engagement with such notches by the pressure due to the elasticity of the cushions.

In testimony whereof we affix our signatures in presence of two witnesses.

JACOB RUPPERT, Jr.
ERNEST SIEGEL.

Witnesses:
E. W. Scherr, Jr.,
Clarence G. Campbell.